United States Patent
Hwang et al.

(10) Patent No.: US 9,441,941 B2
(45) Date of Patent: Sep. 13, 2016

(54) DEFORMATION MEASUREMENT SENSOR FOR MEASURING PRESSURE AND SHEARING FORCE AND STRUCTURE THEREFOR

(71) Applicant: KOREA ELECTRONICS TECHNOLOGY INSTITUTE, Seongnam-si, Gyeonggi-do (KR)

(72) Inventors: Junghoon Hwang, Seoul (KR); Youngouk Kim, Bucheon-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/409,154

(22) PCT Filed: Nov. 1, 2012

(86) PCT No.: PCT/KR2012/009118
§ 371 (c)(1),
(2) Date: Dec. 18, 2014

(87) PCT Pub. No.: WO2013/191333
PCT Pub. Date: Dec. 27, 2013

(65) Prior Publication Data
US 2015/0143915 A1    May 28, 2015

(30) Foreign Application Priority Data
Jun. 22, 2012  (KR) .................. 10-2012-0067119

(51) Int. Cl.
*G01L 1/22* (2006.01)
*G01B 7/16* (2006.01)
(Continued)

(52) U.S. Cl.
CPC .  *G01B 7/16* (2013.01); *G01L 1/18* (2013.01); *G01L 1/205* (2013.01); *G01L 1/22* (2013.01); *G01L 5/0057* (2013.01); *G01L 5/162* (2013.01)

(58) Field of Classification Search
CPC ........... G01B 7/16; G01L 1/205; G01L 1/22; G01L 1/18; G01L 5/162; G01L 5/0057; G01L 5/00; G01L 1/2337; G01L 5/161; G01P 15/123; G01P 15/18; G01P 15/12
USPC ..................................... 73/763, 514.33, 862
See application file for complete search history.

(56) References Cited

FOREIGN PATENT DOCUMENTS

JP            07055598 A         3/1995
JP          2005249772 A         9/2005
(Continued)

OTHER PUBLICATIONS

Kim, Force Torque Sensor, Force Torque Sensor Frame, and Force Torque Measurement Method, May 10, 2012, Pg pub, 1-20.*
(Continued)

*Primary Examiner* — Harshad R Patel
*Assistant Examiner* — Brandi N Hopkins
(74) *Attorney, Agent, or Firm* — Hauptman Ham, LLP

(57) ABSTRACT

A deformation measurement sensor for measuring pressures and shearing forces according to the present invention includes: a plurality of beams shaped like a lattice; a strain gauge attached to each of the plurality of beams for measuring a deformation rate; a frame connected to the end of the lattice shape for surrounding the plurality of beams; and holes for arranging lines and formed in the intersections of the plurality of beams, whereby it is possible to precisely measure the deformation rate depending on the pressures or shearing forces exerted to a plurality of areas.

3 Claims, 4 Drawing Sheets

(51) Int. Cl.
*G01L 1/18* (2006.01)
*G01L 5/00* (2006.01)
*G01L 5/16* (2006.01)
*G01L 1/20* (2006.01)

(56) References Cited

FOREIGN PATENT DOCUMENTS

| JP | 2008116371 A | 5/2008 |
|---|---|---|
| KR | 100347334 B1 | 6/2005 |
| KR | 100499970 B1 | 7/2005 |
| KR | 1020110130332 A | 12/2011 |

OTHER PUBLICATIONS

International Search Report for PCT/KR2012/009118 dated Mar. 21, 2013.

* cited by examiner

DEFORMATION MEASUREMENT SENSOR FOR MEASURING PRESSURE AND SHEARING FORCE AND STRUCTURE THEREFOR

TECHNICAL FIELD

The present invention relates to a deformation measurement technique, and more particularly, to a deformation measurement sensor of measuring pressure and shearing force, which precisely measures deformation caused by pressure and shearing force at a plurality of points, and a structure thereof.

BACKGROUND ART

As pressure sensors are elements for measuring pressure in a certain system, the pressure sensors are widely used in various applications including an industrial instrumentation, an automatic control, a medical device, motor engineering apparatuses, an environment control, and an electrical apparatus applications, etc. The measurement principle of the pressure sensors is based on measuring electrical variations due to displacement or deformation, etc, and various types of the sensors are implemented.

Types of the pressure sensors include a mechanical pressure sensor using the Bourdon tube or bellows, a pressure-resistive electronic pressure sensor using a strain gauge, and a capacitive electronic pressure sensor for measuring variations of electrostatic capacitance between two objects, etc. In particular, since the pressure-resistive electronic pressure sensor using strain gauge has superiority in view of performance or price, it has become the most frequently used sensor.

The term "strain" is used to indicate deformity or a deformation rate, represents a proportion of the stretched or shortened length to the original length of the object when the object is elongated or compressed, and is used in applications including civil engineering, aeronautical engineering, and electronics, etc, which deal with an analysis of a structure or a mechanical component when the structure or the component is deformed by an external force. The strain gauge is a gauge which is attached to a surface of the structure to measure the state and the amount of deformation of the structure, and includes an electric strain gauge which measures the amount of deformation of the structure as resistance and a mechanical strain gauge which measures the variation of the length of the structure being deformed.

An element of the electric stain gauge uses metals having large resistance variation, and in this case, a resistance line made in the form of wire or foil on an insulator is used to measure resistance.

The sensor with the strain gauge prevents failures in machinery or safety accidents, and enables the user to be informed of an accident and to respond accordingly. The smaller the sensor becomes, the more efficiently the space can be used without affecting other driving parts.

However, the pressure sensor can only measure the deformation rate caused by pressure applied in a perpendicular direction on the structure, and thus it is difficult to measure a deformation rate caused by pressure applied in a parallel direction on the structure.

Further, since it is required to have a separate deforming structure to measure the deformation rate caused by a shearing force, there is a problem in that overall size of the sensor increases. Thus, there is a need to provide a sensor that is small in size and can measure both of the deformation rates caused by pressure or shear force.

DISCLOSURE

Technical Problem

In view of the above mentioned problems of conventional art, the present invention has an objective to provide a sensor for measuring deformation and a structure thereof which can be made small in size and make deformation caused by pressure or shearing force to be measured more precisely

Technical Solution

The sensor for precisely measuring deformation caused by pressure and shearing force achieves the objective by including: a plurality of beams formed in a lattice shape and having holes for wiring formed at intersections thereof; a strain gauge attached to each of the plurality of beams for measuring a deformation rate; a frame connected to ends of the lattice shape and formed to surround the plurality of beams; and holes for wirings formed at the intersections of the plurality of beams.

According to the deformation measurement sensor for measuring pressure and shearing force of the present invention, the beams have a smaller thickness than the frame.

According to the deformation measurement sensor for measuring pressure and shearing force of the present invention, it further comprises supports for supporting the plurality of beams at bottoms of the intersections, and the holes for wiring are formed through the intersections and the supports.

According to the deformation measurement sensor for measuring pressure and shearing force of the present invention, the sum of the thicknesses of the intersection and the support is the same as the thickness of the frame.

According to the deformation measurement sensor for measuring pressure and shearing force of the present invention, the strain gauge is located on at least one of a top surface and a bottom surface of the beams for measuring the deformation rate caused by pressure.

According to the deformation measurement sensor for measuring pressure and shearing force of the present invention, the strain gauge is located on at least one of both side surfaces of the beams for measuring the deformation rate caused by shear force.

According to the deformation measurement sensor for measuring pressure and shearing force of the present invention, the beams have at least one of shapes of a prism, a cylinder, a truncated pyramid, a pillar with both ends having a smaller thickness than other portions, a pillar with both ends having a greater thickness than other portions, and a pillar having at least one gradient shape in a longitudinal direction.

The deformation measurement sensor structure for measuring deformation caused by either of pressure and shearing force achieves the objective by including: a plurality of beams formed in a lattice shape, having holes for wiring formed at intersections thereof, and having a strain gauge attached thereto for measuring a deformation rate; a frame connected to ends of the lattice shape and formed to surround the plurality of beams; and holes for wiring formed in the intersections of the plurality of beams.

Advantageous Effects

According to the present invention, a deformation measurement sensor, a structure thereof and a method for manufacturing the same have the following effects.

First, a deformation rate caused by pressure or shearing force applied to a plurality of points can be measured precisely.

Second, since a deforming structure formed in a lattice shape is adapted, large deformation can occur by relatively small pressure or shearing force, thereby enabling a small deforming structure to be manufactured and reducing the overall size of the sensor.

Third, in the case of pressure or shearing force being applied to a certain beam, since supports are located at bottoms of beams formed in a lattice shape, deformation of other beams can be reduced by interference.

MODES OF THE INVENTION

Figure 1:
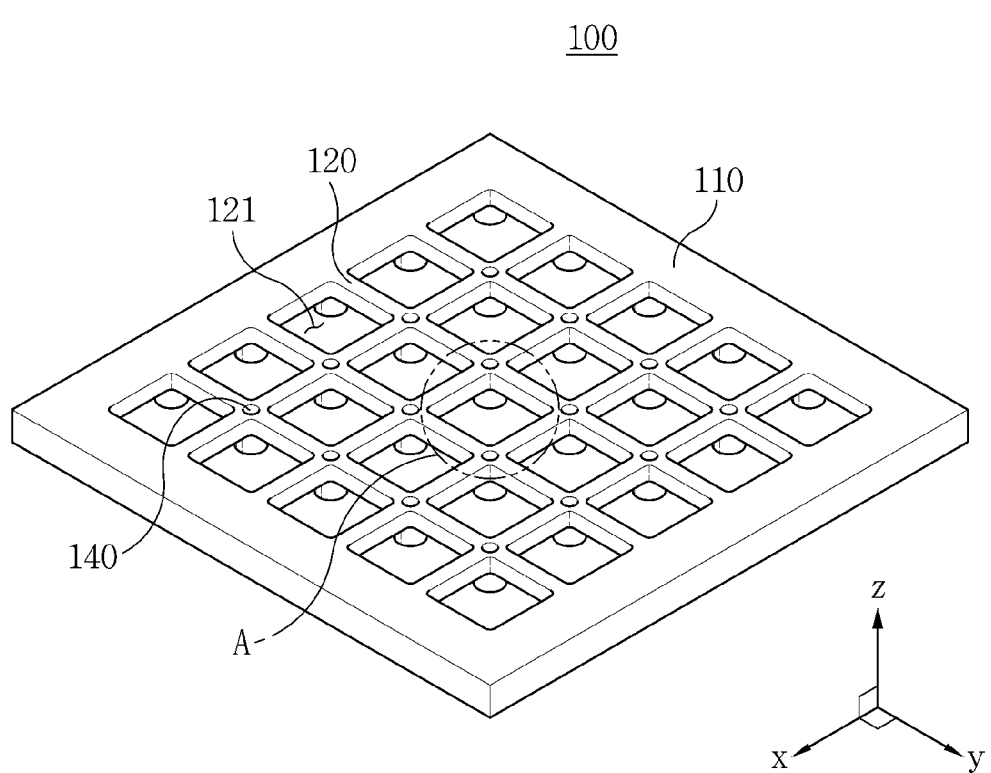
FIG. 1 illustrates a perspective view of a sensor for measuring deformation according to a first exemplary embodiment of the present invention.

In the following description of the present invention, a detailed description is provided only to help general understanding of the present invention, and it is apparent to those skilled in the art a detailed description of known functions and configurations incorporated herein will be omitted when it may make the subject matter of the present invention rather unclear.

Here, the technical terms and words used in the specification and claims must not be interpreted according to limited definitions thereof, such as ordinary or dictionary meanings, but must be understood to represent meanings and concepts corresponding to the technical scope and spirit of the invention. Thus, those skilled in the art will appreciate that the construction of the embodiments and drawings of the invention have been disclosed as that of preferred embodiments, and thus various modifications, additions and substitutions are possible, without departing from the scope and spirit of the invention as disclosed in the accompanying claims Referring to the drawings, the embodiments of the present invention are disclosed below in detail.

Figure 2:
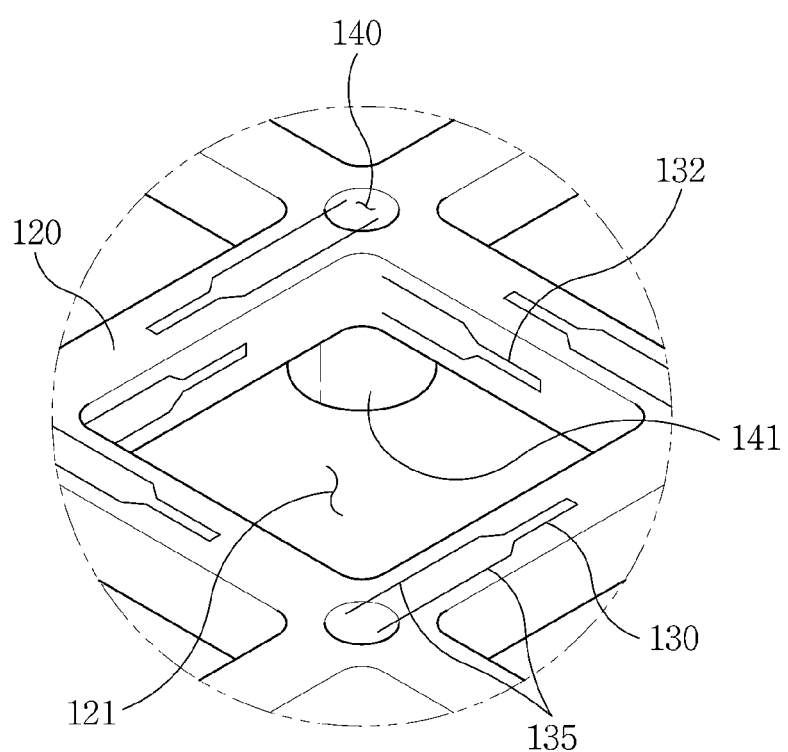
FIG. 2 illustrates an enlarged perspective view of a portion A of FIG. 1.
Figure 3:
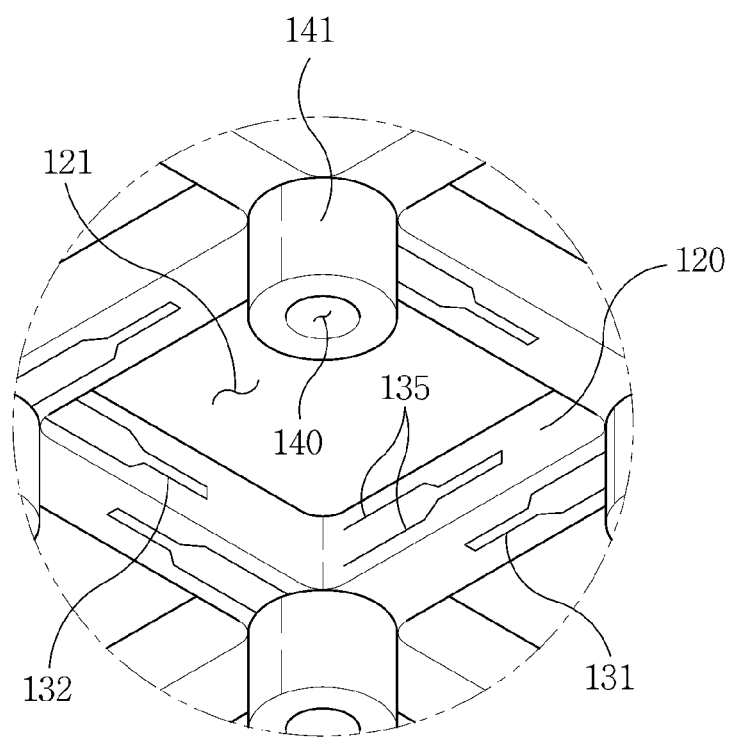
FIG. 3 illustrates a partly enlarged bottom perspective view of the sensor for measuring deformation according to the first exemplary embodiment of the present invention.

FIG. 1 illustrates a perspective view of a sensor for measuring deformation 100 according to a first exemplary embodiment of the present invention. FIG. 2 illustrates an enlarged perspective view of a portion A in FIG. 1. FIG. 3 illustrates a partly enlarged bottom perspective view of the sensor for measuring deformation 100 according to the first exemplary embodiment of the present invention.

Referring FIGS. 1 to 3, the sensor for measuring deformation 100 of the first embodiment includes a frame 110, a plurality of beams 120, strain gauges 130, 131, and 132 and holes for wirings 140.

The frame 110 is hollow at the center, surrounds the plurality of beams 120, and has a thickness greater than the plurality of beams 120.

The plurality of beams 120 are formed in a lattice shape with spaces 121 formed through the frame 110 as a structure being deformed by pressure or shearing force. Since the plurality of beams 120 have smaller thicknesses than the frame 110, the plurality of beams 120 can be easily deformed by pressure or shearing force.

Each of the strain gauges 130, 131, and 132 is respectively attached onto a top or bottom of each of the beams 120 and one or more of both side surfaces of each beam 120, and measures the deformation rate.

The strain gauge 130 attached on the top of the beam 120 and the strain gauge 131 attached on the bottom of the beam 120 measure the deformation rate of the beam 120 caused by pressure. That is, when the pressure is applied in a Z-axis direction perpendicular to the beam 120, then the beam 120 is deformed, thereby the stain gauges 130 and 131 measure the deformation rate.

The strain gauge 132 attached on the lateral sides of the beam 120 measures a deformation rate of the beam 120 caused by shearing force. That is, when the shearing force is applied in an X-axis or Y-axis direction parallel to the beam 120, then the beam 120 is deformed, thereby the stain gauges 130 and 131 measure the deformation rate.

The holes for wirings 140 are provided for wirings 135 of the strain gauges, and the wirings 135 are connected to wires for processing signals through the holes for wirings 140.

In this case, the holes for wirings 140 are located at the intersections of the plurality of beams 120 such that each of the wirings 135 of the strain gauges 130, 131, and 132 may be easily passed through.

The holes for wirings 140 are formed through the intersections of the plurality of beams 120 and supports 141 formed on the bottoms of the intersections.

In this case, the sum of the thicknesses of the intersection of the plurality of beams 120 and the support 141 formed on the bottom of the intersection is the same as the thickness of the frame.

By this configuration, in the case of mounting the sensor for measuring deformation 110 on a substrate, the supports 141 serve to support the intersections of the plurality of beams 120. Accordingly, in the case of mounting the sensor for measuring deformation 110 on a substrate, the beams 120 may be easily deformed by pressure or shearing force.

Also, when pressure or shearing force is applied to a certain beam 120, the supports 141 serve to reduce the amount of deformation of other beams 120 by interference.

In the sensor for measuring deformation, since the both ends of the beams 120 are connected to the intersections of the plurality of beams 120 or the frame 110, the deformation rate caused by pressure is the greatest in the center of a single beam 120. Thus, the center of measurement by the strain gauges 130, 131, and 132 is preferred to be located at the center of each beam 120.

In the sensor for measuring deformation, the beams 120 can have at least one of shapes of a prism, a cylinder, a truncated pyramid, a pillar with both ends having a smaller thickness than other portions, a pillar with both ends having greater thickness than other portions, and a pillar having at least one gradient shape in a longitudinal direction such that the deformation rate may be measured easily.

In the sensor for measuring deformation 100 according to the first embodiment, the plurality of beams 120 are formed in a lattice shape with spaces 121, and have a configuration of its both ends being connected to the intersections of the plurality of beams 120 or the frame 110. Thus, the deformation rate caused by pressure or shearing force is greater than the conventional case in which the strain gauges are attached on a planar substrate to measure the deformation rate.

In addition, the sensor for measuring deformation 100 may measure the deformation rate caused by both of pressure and shearing force, without having a structure deformed by pressure and a structure deformed by shearing force separately.

Accordingly, in the sensor for measuring deformation 100, the beams 120 which are structures being deformed by pressure or shearing force can be manufactured small in size, thereby providing the effect of reducing the overall size of the sensor for measuring deformation 100.

When the deformation rate caused by pressure is measured by the conventional method in which the strain gauges are disposed on the planar substrate, the deformation rate is small, so the accuracy is low. Additionally, since the deformation rate is relatively small in the peripheral region of the substrate while the deformation rate is relatively large in the central region, it is advantageous to dispose the strain gauges in the central region, and thus it is difficult to measure pressure at multiple points.

In contrast, the sensor for measuring deformation 100 has beams 120 which form a deforming structure formed in a lattice shape such that there are advantages of measuring deformation rate caused by pressure and shearing force at multiple points simultaneously.

In the sensor for measuring deformation 100, the frame 110 may be formed of iron, nickel-chromium-molybdenum steel, stainless steel, a tool steel, hardened stainless steel, an aluminum alloy, or duralumin, etc. and may select various materials depending on the properties of materials.

Figure 4:
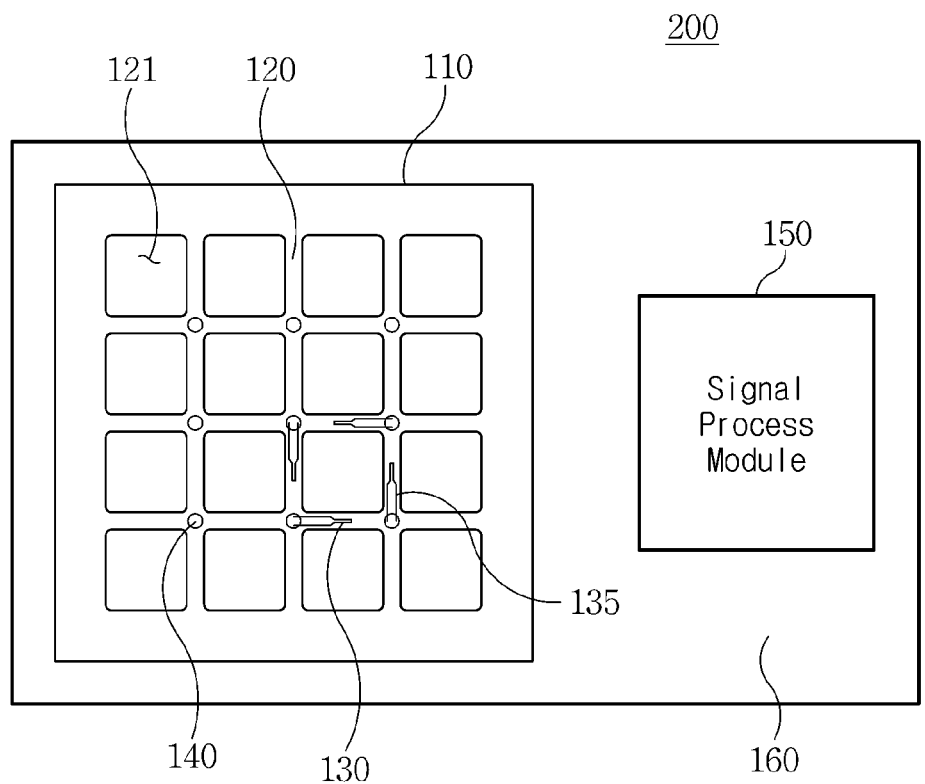
FIG. 4 illustrates a configuration view of a sensor for measuring deformation according to a second exemplary embodiment of the present invention.
Figure 5:
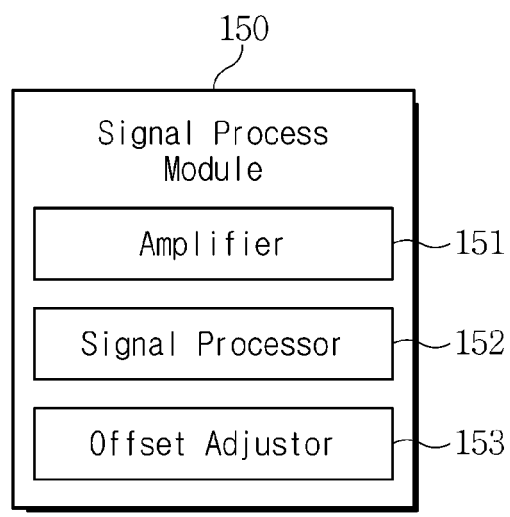
FIG. 5 illustrates a block diagram of a signal process module included in the sensor for measuring deformation of the second exemplary embodiment of the present invention.

FIG. 4 illustrates a configuration view of a sensor for measuring deformation 200 according to a second exemplary embodiment of the present invention. FIG. 5 illustrates a block diagram of a signal process module 150 included in the sensor for measuring deformation 200 of the second exemplary embodiment of the present invention.

Referring FIG. 4, the sensor for measuring deformation 200 includes a frame 110, a plurality of beams 120, strain gauges 130, holes for wirings 140 and a signal process module 150.

The frame 110 is hollow at the center and surrounds the plurality of beams 120.

The plurality of beams 120 are formed in a lattice shape with spaces 121 formed through the frame 110 as a structure being deformed by pressure or shearing force.

The beams 120 may have at least one of the shapes consisting of shapes of a prism, a cylinder, a truncated pyramid, a pillar with both ends having smaller thickness than other portions, a pillar with both ends having greater thickness than other portions, and a pillar having at least one gradient shape in a longitudinal direction such that the deformation rate can be measured easily.

In the sensor for measuring deformation 200, the frame 120 may be formed of iron, nickel-chromium-molybdenum steel, stainless steel, a tool steel, hardened stainless steel, an aluminum alloy, or duralumin, etc. depending on the properties of the material.

The strain gauges 130 are attached to the plurality of beams 120 for the deformation rate, respectively. At this time, the strain gauges 130 may be disposed on one or more of a top, a bottom or both sides for measuring the deformation rate caused by pressure or shearing force.

The holes for wirings 140 are provided for wirings 135 of the strain gauges, and the wirings 135 are connected to wires for processing signals from the substrate through the holes for wirings 140.

The holes for wirings 140 are located at the intersections of the plurality of beams 120 such that each of the wirings 135 of the strain gauges 130 may be easily passed through.

The signal process module 150 is configured to process signals from the strain gauges 130.

In the sensor for measuring deformation 200 according to the second embodiment, the signal process module 150 is disposed on the same substrate as the sensor for measuring deformation 200, and the signal process module 150 receives the deformation rate measurement signals measured by the strain gauges 130 via conductive circuits of the substrate. The sensor for measuring deformation 200 configured to be disposed on a single substrate makes it easy to manufacture the sensor for measuring deformation 200 with the signal process module 150.

Although the sensor for measuring deformation 200 with the signal process module 150 is implemented on a single substrate 160 in the second embodiment, the signal process module 150 may be disposed on a separate substrate according to embodiment, and all of the embodiments are contemplated as being within the scope of the invention.

Referring FIG. 5, the signal process module 150 includes an amplifier 151, a signal processor 152 and an offset adjustor 153.

The amplifier 151 amplifies signals from the strain gauges 130 formed of a thin film of a semiconductor, etc. such that small signals from the strain gauges 130 may be amplified appropriately to analyze. The amplified signals are transmitted to the signal processor 152 or the offset adjustor 153.

The signal processor 152 is configured to receive the signals from the amplifier 151 and to digitalize the signals. That is, when the sensing signals are transmitted from the strain gauges 130, the signal processor 152 may digitalize the sensing signals and quantify the pressure and shearing force applied to the plurality of beams 120.

The offset adjustor 153 is configured to process the offset of the sensing signals from the strain gauges 130. For example, a deformation may occur in the course of attaching the strain gauges 130 of the type of a thin film of a conductor to the plurality of beams 120. Thus, the strain gauges 130 initially sense resistance without pressure or shearing force being applied, and the offset adjustor supports initialization depending on the sensing results. By means of this course, measurement errors can be reduced when the deformation rate caused by pressure or shearing force are measured.

It would be understood by those skilled in the art that the above-described embodiments are illustrative in all aspects and do not limit the present disclosure. It will be apparent to those skilled in the art that various modifications or alterations can be contrived and implemented within the scope described in the specification, and these modifications and alterations also fall within the technical scope of the present invention.

The invention claimed is:

1. A sensor for measuring deformation caused by pressure and shearing force, the sensor comprising:
   a plurality of beams disposed in a lattice shape, configured to be deformed by pressure or shearing force, and having holes for wiring,
   wherein the holes are disposed at intersections of the plurality of beams;
   a strain gauge attached to each of the plurality of beams and configured to measure a deformation rate of the each of the plurality of beams which is deformed by the pressure or shearing force into the beams;
a frame connected to ends of the lattice shape and disposed to surround the plurality of beams; and
supports configured to support the plurality of beams at bottoms of the intersections,
wherein the holes for wiring are formed through the intersections and the supports,
wherein the beams have a smaller thickness than the frame,
wherein the sum of the thicknesses of the intersections and the support is the same as the thickness of the frame,
wherein the strain gauge is located on at least one of a top surface and a bottom surface of the beams for measuring the deformation rate caused by pressure, and
wherein the strain gauge is located on at least one of both side surfaces of the beams for measuring the deformation rate caused by shear force.

2. The sensor for measuring deformation of claim 1, wherein the beams have at least one shape of shapes of a prism, a cylinder, a truncated pyramid, a pillar with both ends having a smaller thickness than other portions, a pillar with both ends having a greater thickness than other portions, and a pillar having at least one gradient shape in a longitudinal direction.

3. A deformation measurement sensor structure for measuring deformation caused by either of pressure and shearing force, the deformation measurement sensor structure comprising:

a plurality of beams disposed in a lattice shape, configured to be deformed by the pressure or the shearing force, and having holes for wiring, and having a strain gauge attached each of the plurality of beams and configured to measure a deformation rate of the each of the plurality of beams which is deformed by the pressure or shearing force into the beams, wherein the holes are disposed at intersections of the plurality of beams, and having a strain gauge attached thereto for measuring a deformation rate;
a frame connected to ends of the lattice shape and disposed to surround the plurality of beams; and
supports configured to support the plurality of beams at bottoms of the intersections,
wherein the holes for wiring are formed through the intersections and the supports,
wherein the beams have a smaller thickness than the frame,
wherein the sum of the thicknesses of the intersections and the support is the same as the thickness of the frame,
wherein the strain gauge is located on at least one of a top surface and a bottom surface of the beams for measuring the deformation rate caused by pressure, and
wherein the strain gauge is located on at least one of both side surfaces of the beams for measuring the deformation rate caused by shear force.

* * * * *